May 23, 1972    R. SPIETH    3,664,692
DEVICE FOR MEASURING A CYLINDRICAL BODY
Filed July 29, 1970    2 Sheets-Sheet 1

INVENTOR.
Rudolf Spieth
BY
Watson Cole Grindle & Watson
Attys.

United States Patent Office 3,664,692
Patented May 23, 1972

3,664,692
DEVICE FOR MEASURING A
CYLINDRICAL BODY
Rudolf Spieth, Kennenburger Strasse 40, D73 Esslingen
am Neckar, Kennenburg, Germany
Filed July 29, 1970, Ser. No. 59,091
Claims priority, application Germany, July 29, 1969,
P 19 38 449.7
Int. Cl. F16d 1/06
U.S. Cl. 287—52                                    5 Claims

ABSTRACT OF THE DISCLOSURE

A device for securing a cylindrical body to a locating body comprising a locking ring having one annular groove extending into it from its interior and one extending into it from its exterior, the locking ring being supported on a surface of the locating body in a manner whereby the exterior annular groove is adjacent such surface, and that of the locking ring which is adjacent the locating body abutting axially against the cylindrical body in such a manner that when the locking ring is tightened up, it retains its position relative to the other parts of said locking ring. The intermediate outer portion of the ring between the grooves is displaced when the ring is tightened up and the locking ring section adjacent said locating body surface retains its position during the locking operation so that there will be no mutual displacement between the cylindrical body and the locating body.

Figure 1:
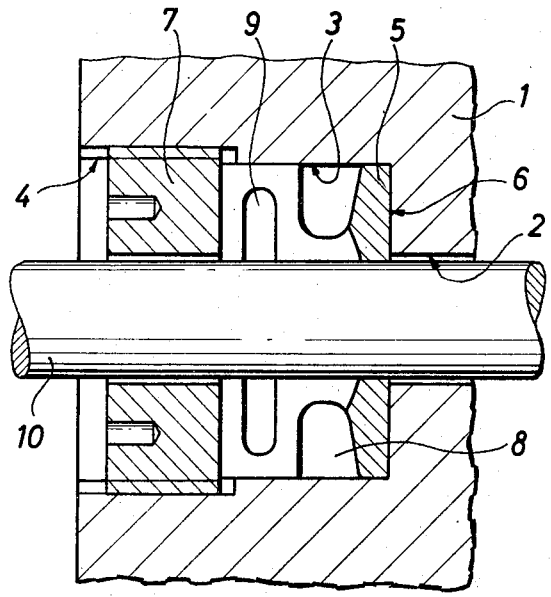

This invention relates to a device for securing a cylindrical body within a locating body by means of a one-piece locking ring bearing against a surface of an oversized bore of the locating body. The locking ring may be tensioned in an axial direction of the cylindrical body by means of at least one tensioner element, said locking ring having, between two outer ring portions thereof a narrow intermediate ring portion defined by external and internal annular grooves, said intermediate ring portion being connected with one of the outer ring portions, and the locking ring bearing laterally against the locating body.

In one known locking device, the tensioner element is distorted in the manner of a spring washer and bears along its outer periphery against annular surfaces which are substantially narrower than the annular surface of the tensioner element and are located near the side at which the adjacent ring grooves open out. When the tensioner element is tightened up, therefore, displacement of the cylindrical body relative to the locating body, or vice versa, takes place and in many applications this is undesirable.

Also known is an adjuster ring in which the portion remote from the locating body is substantially stronger than the portion adjacent the locating body. In this manner, only one of the cylindrical surfaces adjacent one of its annular grooves will be assured of bending and this mechanism is exploited to secure a first body to a locating body.

The object of the present invention is to provide a device for locking a cylindrical body which can be secured in position relative to a locating body, without either of the two bodies being axially displaced in relation to the other. In accordance with the invention this objective is achieved in that the locking ring has only simply one annular groove extending into its from the interior and one extending into it from the exterior thereby defining an intermediate ring portion, the ring being supported against a surface of an oversized bore of the locating body so that its external groove is adjacent said surface. A portion of the ring, abuts axially against the cylindrical body in such a manner that when the locking ring is tightened up, it retains its position relative to the other parts of said locking ring. That ring surface which, when the locking ring is tightened up, influences the cylindrical body, is located near the supporting surface of the locating body and the intervening part of the locking ring is so designed that it executes no movement axially, with the consequence that there can be no mutual displacement of the two bodies when the locking ring is tightened up. Consequently, it is possible to accurately position the two bodies in relation to one another in the axial direction of the cylindrical body, and to permanently secure the bodies in this position by tightening up the locking ring.

In accordance with a further development of the invention, an increase in the locking force of the locking ring can be achieved by providing the locking ring with radial slots disposed in a uniform manner and extending through its central axis, which slots penetrate to a point at a short distance from the supporting surface of the ring which is adjacent the locating body. The radial slots are arranged in a star pattern.

In order to set a specific load or tension between the cylindrical body and the locking ring, the tensioner element must be adjusted against the stop element. Also if an additional tensioner element is to be used and the locking ring is to be additionally tightened up a specific clearance should be set up for the locking ring between the cylindrical body and the locating body.

The invention further provides for the locking ring to be tensioned by means of tensioner elements uniformly distributed about its periphery and accessible from that side which is remote from the side at which it is supported, and for it to be threadedly connected at its supporting side to either the cylindrical body or the locating body, in particular to the locating body. The locking ring may therefore be threadedly secured to one of the bodies so that its position in relation to this particular body is fixed and so that when the locking ring is tightened up, the two bodies can be locked together without experiencing any mutual axial displacement.

Other advantages will be apparent from the following description taken in conjunction with the accompanying drawings, in which devices for locking a cylindrical body exhibiting a cylindrical locating surface, to a locating body, have been schematically illustrated, by way of examples only of the subject of the invention.

Figure 3:
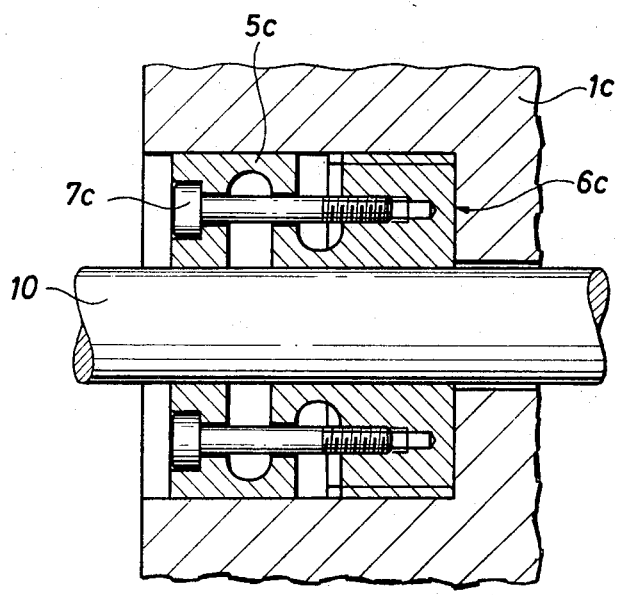
Figure 2:
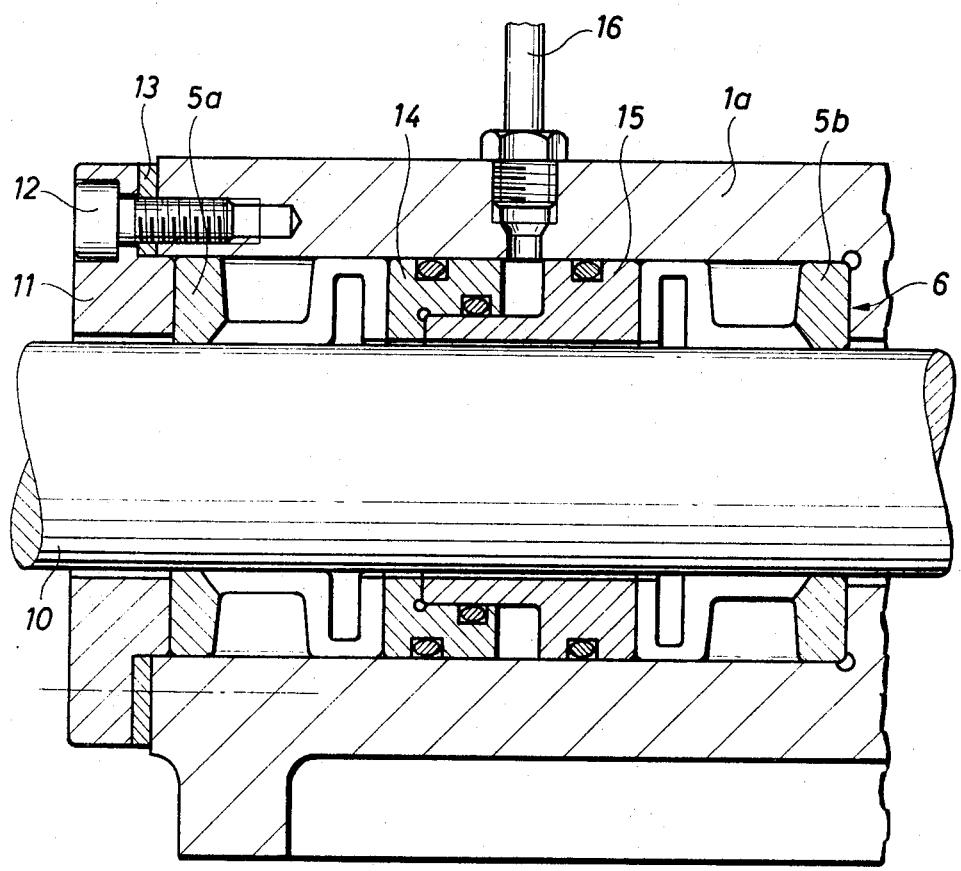

FIGS. 1 to 3 respectively illustrate a longitudinal section through each of the embodiments in accordance with the invention.

A locating body 1 has a stepped longitudinal bore 2, 3 and 4 with different diameters, the bore section 4 being threaded. In the bore section 3 a locking ring 5 is inserted whose end face is seated flush against a shoulder 6 defined between bore sections 2 and 3. In such way, that portion of the locking ring to seat here adjacent the shoulder 6 is immovable while it is being tightened up by means of a tensioner element 7, in bore section 4, designed as a threaded ring threaded into locating body 1.

The locking ring 5 has two annular grooves 8 and 9, of which the one is an external groove disposed in proximity to the shoulder 6, while the other is an internal groove disposed in proximity to the tensioner element 7. The locking ring 5 is provided with radial slots extending through its center axis, arranged uniformly in a star pattern, and which penetrate to a point at a short distance from the surface which abuts against shoulder 6. In this manner, by means of a smaller-than-normal axial load applied by the tensioner element 7, the locking ring 5 effects just as adequate a radial locking force as would be obtained with a normal load without any slots in the locking ring, or, for a normal axial load, the radial locking force is larger, that is, the locking ring 5 expands more in the radial direction due to the slots.

The locating body 1 is penetrated at least partially by a cylindrical body 10 which is either axially displaceable or rotatably supported in the locking ring 5 with a clearance which is adjustable by means of the tensioner element 7, or is fixed in the locking ring 5 and thus in the locating body 1. When the locking ring 5 is tightened up, the intermediate ring portion disposed between the annular grooves 8 and 9 deflects and it is solely that part of the outer portion of the locking ring 5 adjacent the tensioner element 7 which is displaced; while the locking ring section adjacent the shoulder 6 and also the adjoining sliding or clamping surface of the locking ring 5, retains its position during the locking operation so that there is no mutual displacement between the two bodies 1 and 10.

FIG. 2 illustrates a device for guiding and locking a cylindrical body 10 with the help of two locking rings 5a and 5b installed in opposition to one another, both of which are assembled in the locating body 1a, the locking ring 5b abutting against the shoulder 6 in the locating body and the locking ring 5a, at its end remote from the ring 5b, against a cover 11 which is secured by screws 12 to the locating body 1a. A shim 13 is interposed between cover 11 and locating body 1a.

Between the two locking rings 5a and 5b, there are two annular pistons 14 and 15 between which a connecting line 16 from a hydraulic or pneumatic pressure source, is disposed. Instead of the annular pistons 14 and 15 and the line 16, it is equally possible to employ a mechanical tensioner device.

The shim 13 is chosen in accordance with the requisite bearing clearance on the part of the cylindrical body 10 in the locking rings 5a and 5b so that the cylindrical body 10, which is in the form of a circular cylinder, can be axially displaced and if required rotated as well.

The pressure medium introduced through the line 16, tends to urge the annular pistons 14 and 15 apart so that the locking rings 5a and 5b are tightened up to secure the cylindrical body 10 in position without the latter being displaced axially relative to the housing 1a, during the locking operation. When the pressure is relaxed, the original clearance between each of the locking rings 5a, 5b, and the cylindrical body 10, is restored.

The third example, shown in FIG. 3, illustrates a locking body 1c and a cylindrical body 10 held therein by a locking ring 5c, in a guided or clamped relationship. In order to tighten up the locking ring 5c, tensioner elements 7c distributed radially therearound and in the form of screws which can be threaded into that part of the ring adjacent the shoulder 6c, are provided. Such ring portion is also threaded into the locating body 1c in order to secure the locking ring in position. In the example of FIG. 3, when the locking ring 5c is tightened up by means of the screws 7c, no axial displacement of the cylindrical body 10 relative to the locating body 1c, takes place. The screws 7c pass through the narrow intermediate ring section of the locking ring 5c, with a clearance fit so that this intermediate ring section can distort in the fashion of a spring washer. In the locking ring 5c, in the same way as in the locking ring 5, slots disposed between the tensioner elements 7c and arranged in a star pattern, can be provided. Instead of tension screws 7c, compression or thrust screws can also be provided. A grub screw acting as a thrust screw can be threaded into that part of the locking ring 5c which is remote from the shoulder 6c, the screw passing through the central part of the ring with a clearance fit and seating against that of its parts adjacent the shoulder 6c.

I claim:

1. A device for securing a cylindrical body having a smooth cylindrical surface to a locating body, comprising a one-piece cylindrical locking ring with both its inner and outer peripheral surfaces being at least partially smooth, at least one tensioner element adjacent a shim element for tensioning said locking ring in an axial direction of said cylindrical body, said shim element provided for said tensioner element in order to set a specific load between said cylindrical body and said locking ring upon adjustment of said tensioner element, a pair of annular grooves on said locking ring defining a ring portion on both said outer and inner peripheral surfaces and a narrow intermediate ring portion disposed between said outer and inner ring portions, one of said grooves opening outwardly into said outer surface and the other of said grooves opening inwardly into said inner surface, said ring abutting against a support surface of said locating body and being so disposed that said outwardly extending groove lies adjacent said surface, said ring portion on said inner peripheral surface abutting axially against said cylindrical body so that when said ring is tightened up by said tensioner element, it retains its position relative to the remaining parts of said locking ring.

2. A device as claimed in claim 1, characterized in that radial slots are provided in said locking ring, passing through its central axis and in a uniform arrangement and extending to a point at a short distance from said support surface.

3. A device as claimed in claim 1, including an additional tensioner element being provided so that said locking ring may be additionally tightened up.

4. A device as claimed in claim 3, characterized in that two locking rings with supporting surfaces which face away from one another, are provided, the supporting surface of one locking ring abutting against said locating body support surface and the supporting surface of the other one of said rings co-operating with said tensioner element, said additional tensioner element, which is externally operable, is disposed between said two locking rings.

5. A device as claimed in claim 1, characterized in that several of said tensioner elements are provided each uniformly distributed radially about said locking ring for tightening same, said elements being accessible from the end remote from the end at which said locking ring is supported against said locating body.

References Cited

UNITED STATES PATENTS 3,089,739  5/1963  Spieth _____ 308—237
3,168,338  2/1965  Spieth _____ 287—52

FOREIGN PATENTS 1,131,486  6/1962  Germany _____ 279—2
  853,081 10/1952  Germany _____ 151—21 C
  254,335 12/1948  Switzerland _____ 151—21 C
  869,892  3/1953  Germany _____ 287—52 R ANDREW V. KUNDRAT, Primary Examiner U.S. Cl. X.R.

151—21 C